Figure 1:
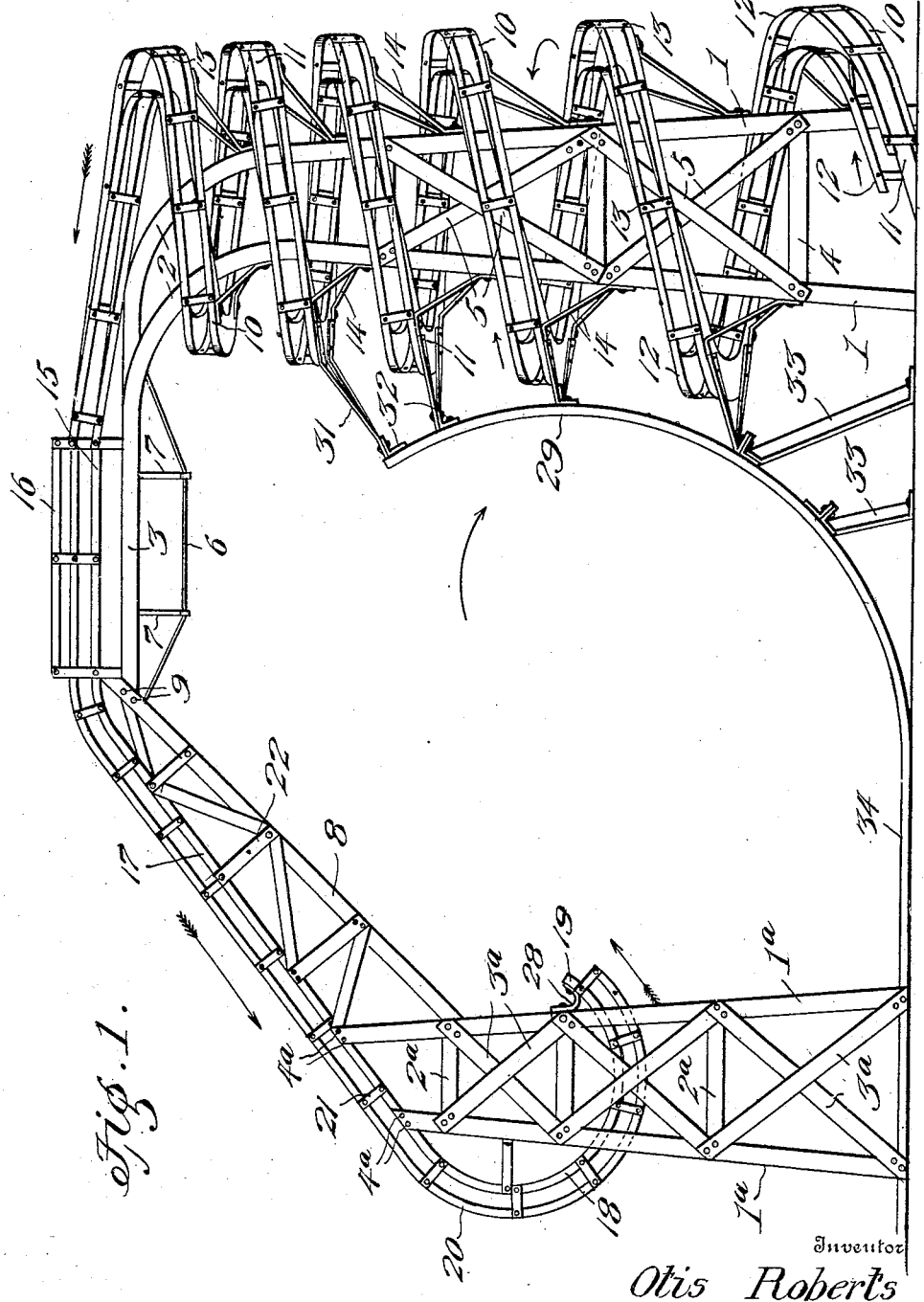

No. 864,033. PATENTED AUG. 20, 1907.
O. ROBERTS.
AMUSEMENT APPARATUS.
APPLICATION FILED FEB. 1, 1907.

2 SHEETS—SHEET 1.

Witnesses:
Frank B. Hoffman

Inventor
Otis Roberts
By Victor J. Evans
Attorney

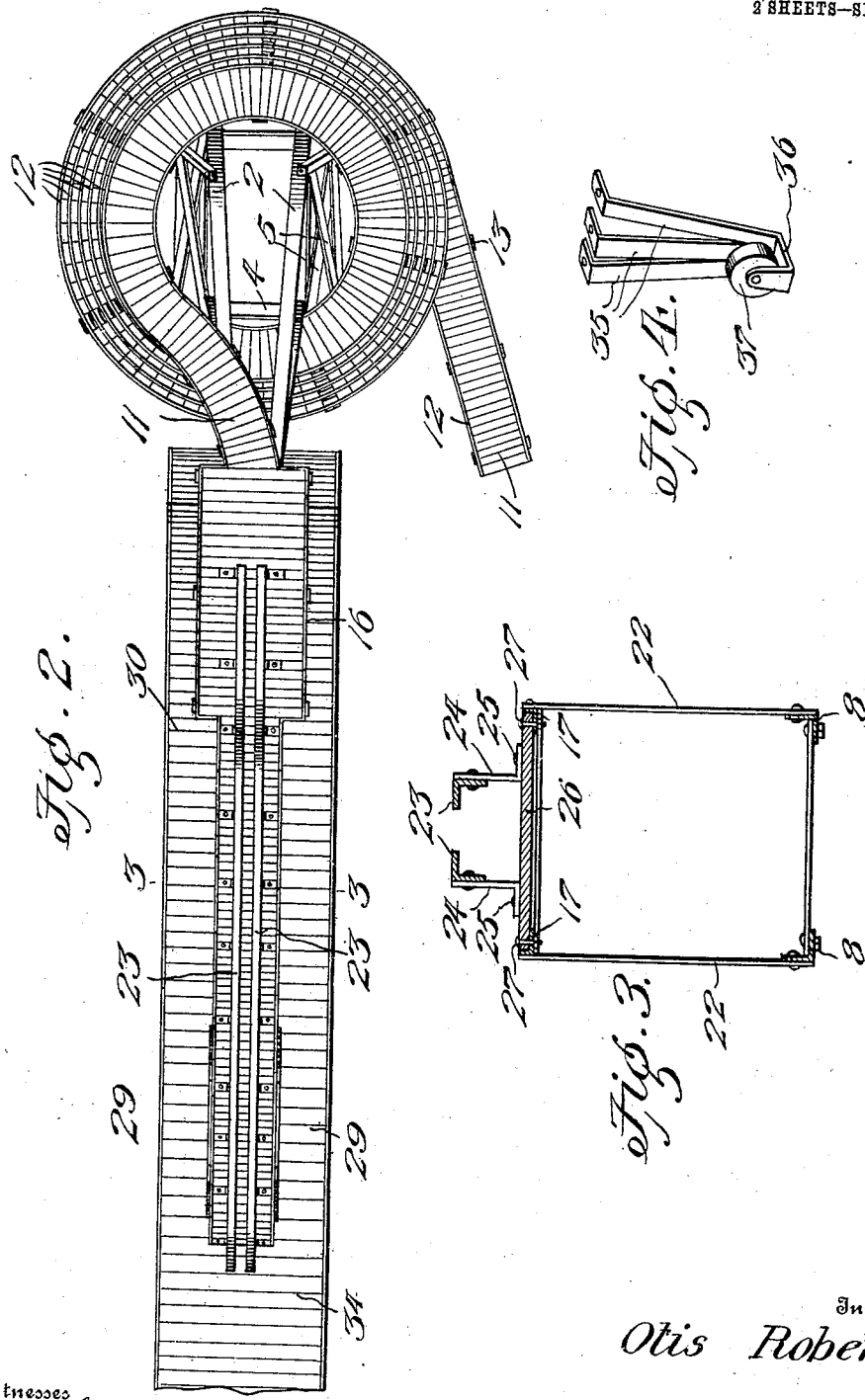

UNITED STATES PATENT OFFICE.

OTIS ROBERTS, OF WINFIELD, KANSAS.

AMUSEMENT APPARATUS.

No. 864,033.  Specification of Letters Patent.  Patented Aug. 20, 1907.

Application filed February 1, 1907. Serial No. 355,247.

*To all whom it may concern:*

Be it known that I, OTIS ROBERTS, a citizen of the United States of America, residing at Winfield, in the county of Cowley and State of Kansas, have invented new and useful Improvements in Amusement Apparatus, of which the following is a specification.

This invention relates to amusement apparatus, and one of the principal objects of the same is to provide strong and durable framework for an automobile or bicycle loop apparatus.

Another object of the invention is to simplify the construction of apparatus of this character and to render it more safe, durable and substantial than those hitherto in use.

These and other objects may be attained by means of the construction illustrated in the accompanying drawings, in which:

Figure 1 is a side elevation of an apparatus made in accordance with my invention. Fig. 2 is a plan view of the same. Fig. 3 is an enlarged section on the line 3—3, Fig. 2. Fig. 4 is a detail perspective view of a hanger designed to be secured to the axles of a bicycle or to the framework of an automobile to be used as an auxiliary to my apparatus.

In carrying out my invention I make up a suitable framework of angle iron bars and braces and secure them together in a substantial manner as will now be described.

The uprights or standards 1 of the main tower are angle iron beams which are curved near their upper ends, as at 2, and extended in a horizontal plane, as at 3. Suitable braces 4 extend across and are secured to the uprights 1 and suitable cross braces 5 are also utilized to hold the uprights 1 in a firm and rigid manner. Truss rods 6 are secured under the horizontal portion 3 of the framework, said rods passing through vertical braces 7 and the ends of said rods being secured to members 1 of the frame. Inclined angle beams 8 are bolted at their upper ends to the outer end of the horizontal portion 3 of the frame, as at 9, and the lower ends of said beams 8 are secured to upright angle iron standards 1ª forming the auxiliary supporting tower. The beams 1ª are braced by means of cross bars 2ª, and diagonal cross braces 3ª. The upper ends of the standards 1ª are bolted, as at 4ª to an inclined rail support to be hereinafter described. A spiral track surrounds the main tower and leads from the ground or horizontal platform to the top of said tower, said spiral track being made up of angle iron beams 10 which are curved and properly secured together to form the spiral track, and secured to said angle iron beams is a suitable floor 11 upon which an automobile or bicycle may run from the bottom to the top of said spiral way. Suitable railings 12 are secured to the angle beams 10 by means of braces 13 at suitable intervals.

The spiral track or way is supported upon the uprights or standards 1 by means of braces 14 secured at their lower ends to the uprights 1 and at their upper ends to the curved beams 10. At the upper end of the spiral way a platform 15 is provided, said platform being in a substantially horizontal plane and provided with suitable railings 16. From the platform 15 an inclined railway extends, said railway comprising angle iron beams 17 having curved or hook shaped lower portions 18 which terminate in an upwardly extending portion 19. Suitable railings 20 are secured to the sides of the inclined railway. Braces 21 connect the railings 20 to the inclined railway 17, and suitable braces 22 extend from the inclined railway 17 to the inclined angle beams 8 upon opposite sides of said railway. A pair of angle iron rails 23 are secured to the braces 24 or brackets secured at their lower end by bolts 25 extending through flanges on said brackets and through the floor boards 26 which are secured by bolts 27 to the angle beams 17 forming the railway. The terminal end 19 of the railway is supported by curved brackets 28 bolted to the uprights 1ª and to said railway. A curved flooring made up of angle irons 29 and floor boards 30 is braced to the spiral way by means of metal braces 31, suitable brackets 32 being secured to the rear side of the curved angle bars 29. Braces 33 are also secured behind the curved portion of the angle irons 29. The flooring 30 terminates in a horizontal portion 34, as shown in Fig. 1.

Two pair of hangers consisting of metal bars 35 are secured to the framework of an automobile or bicycle designed to be used upon my apparatus, the bars 35 terminating in a bracket 36 in which a roller 37 is journaled. These rollers are adapted to engage the under surface of the horizontal member of the rails 23 to hold the vehicle into engagement with said rails.

The operation of my apparatus may be briefly referred to as follows: An automobile or bicycle equipped with the hangers shown in Fig. 4 is started up the spiralway in the direction indicated by the arrows in Fig. 1 until it has arrived at the platform 15 at the top of the apparatus. When the vehicle starts down the inclined track 17 the hanger rollers 37 engage the rails 23 and hold the vehicle in connection with the rails until it has left the terminal end 19 of the railway, and receiving its impetus from the hooked portion of the inclined railway, it is thrown in the direction of the arrow in Fig. 1 in a curved line indicated by the curved arrow in said figure, to the inclined flooring 30 from whence it runs by gravity to the horizontal portion 34 of said flooring.

From the foregoing it will be obvious that my invention is of comparatively simple construction, can be made up quickly of the metal bars; is strong and durable, and will not readily get out of order.

Having thus described the invention, what I claim is:

1. An apparatus of the character described comprising vertical towers, a spiral way supported upon one of the towers, a platform at the top of said spiral way, an inclined railway leading from said platform and terminating in an upwardly extending hook or loop said platform forming a bridge between the upper ends of the spiral and inclined ways, and a curved flooring supported from the spiral way, substantially as described.

2. In an apparatus of the character described, a tower comprising vertical standards composed of angle iron beams, the upper ends of which are curved and terminating in a horizontal extension, metal braces connecting said uprights, a spiral way encircling said tower, braces extending from said uprights to said spiral way, an inclined railway extending from said horizontal portion and terminating in a hook, and a curved flooring connected by braces to the spiral way, substantially as described.

3. In an apparatus of the character described, a spiral way, an inclined railway leading from said spiral way and terminating in a curved hook, angle iron rails connected to said inclined railway, and a hanger having a roller journaled thereto for engagement with the rails, said hanger being secured to a vehicle, substantially as described.

4. In an apparatus of the character described, a spiral way, a platform at the top of said spiral way, an inclined railway leading from said platform and terminating in a hook, said railway comprising angle iron beams, floor boards secured to said beams, brackets secured to said floor boards, and angle iron rails secured to said bracket, in combination with hangers provided with rollers to engage said rails, said hangers adapted for attachment to an automobile or other vehicle, substantially as described.

In testimony whereof, I affix my signature in presence of two witnesses.

OTIS ROBERTS.

Witnesses:
L. H. WEBB,
S. E. FRICK.